(12) United States Patent
Qian et al.

(10) Patent No.: US 7,060,641 B2
(45) Date of Patent: Jun. 13, 2006

(54) DIAMOND-SILICON CARBIDE COMPOSITE

(75) Inventors: Jiang Qian, Los Alamos, NM (US); Yusheng Zhao, Los Alamos, NM (US)

(73) Assignee: The Regents of the University of California, Los Alamos, NM (US)

( * ) Notice: Subject to any disclaimer, the term of this patent is extended or adjusted under 35 U.S.C. 154(b) by 0 days.

(21) Appl. No.: 11/110,252

(22) Filed: Apr. 19, 2005

(65) Prior Publication Data

US 2005/0209089 A1    Sep. 22, 2005

Related U.S. Application Data

(62) Division of application No. 10/448,672, filed on May 30, 2003, now Pat. No. 6,939,506.

(51) Int. Cl.
    *C04B 35/577*    (2006.01)
(52) U.S. Cl. .................................................. 501/90
(58) Field of Classification Search .................. 501/90, 501/88; 51/307
    See application file for complete search history.

(56) References Cited

U.S. PATENT DOCUMENTS

| 3,816,085 A | 6/1974 | Hall ............................. 51/307 |
| 4,151,686 A | 5/1979 | Lee et al. ..................... 51/307 |
| 4,231,195 A | 11/1980 | DeVries et al. ............... 51/307 |
| 4,874,398 A | 10/1989 | Ringwood .................... 51/293 |
| 4,948,388 A | 8/1990 | Ringwood .................... 51/308 |
| 4,985,051 A | 1/1991 | Ringwood .................... 51/309 |
| 5,010,043 A | 4/1991 | Ringwood .................... 501/90 |

FOREIGN PATENT DOCUMENTS

| JP | 56-9276 | * | 1/1981 |
| JP | 2000-203955 | * | 7/2000 |
| WO | 8601433 | | 3/1986 |
| WO | 8807409 | | 10/1988 |

OTHER PUBLICATIONS

J. Qian, G. Voronin, T. W. Zerda, D. He, and Y. Zhao, "High-Pressure, High-Temperature Sintering of Diamond-SiC Composites by Ball-Milled Diamond-Si Mixtures," J. Mater. Res., vol. 17, No. 8, pp. 2153-2160, Aug. 2002.

(Continued)

*Primary Examiner*—Karl Group
(74) *Attorney, Agent, or Firm*—Samuel L. Borkowsky

(57) ABSTRACT

Fully dense, diamond-silicon carbide composites are prepared from ball-milled microcrystalline diamond/amorphous silicon powder mixture. The ball-milled powder is sintered (P=5–8 GPa, T=1400K–2300K) to form composites having high fracture toughness. A composite made at 5 GPa/1673K had a measured fracture toughness of 12 MPa·m$^{1/2}$. By contrast, liquid infiltration of silicon into diamond powder at 5 GPa/1673K produces a composite with higher hardness but lower fracture toughness. X-ray diffraction patterns and Raman spectra indicate that amorphous silicon is partially transformed into nanocrystalline silicon at 5 GPa/873K, and nanocrystalline silicon carbide forms at higher temperatures.

5 Claims, 5 Drawing Sheets

OTHER PUBLICATIONS

E. A. Ekimov, A. G. Gavriliuk, B. Palosz, S. Gierlotka, P. Dluzewski, E. Tatianin, Yu. Kluev, A. M. Naletov, and A. Presz, "High-Pressure, High-Temperature Synthesis of SiC-Diamond Nanocrystalline Ceramics," Appl. Phys. Lett., vol. 77, No. 7, pp. 954-956, Aug. 2000.

G. A. Voronin, T. W. Zerda, J. Qian, Y. Zhao, D. He, and S. N. Dub, "Diamond-SiC Nanocomposites Sintered From a Mixture of Diamond and Silicon Nanopowders," DOE study, under W-7405-ENG-36 Program and M. Gearhart, RockBit International, pp. 1-17, unpublished.

Wolfgang Tillmann, "Trends and Market Perspectives for Diamond Tools in the Construction Industry," International Journal of Refractory Metals & Hard Materials, vol. 18, pp. 301-306, 2000.

I. E. Clark and P. A. Bex, "The Use of PCD for Petroleum and Mining Drilling," Industrial Diamond Review, Jan. 1999, pp. 43-49.

X. Jiang and C.-P. Klages, "Synthesis of Diamond/-β-SiC Composite Films by Microwave Plasma Assisted Chemical Vapor Deposition," Appl. Phys. Lett. vol. 61, No. 14, pp. 1629-1631, Oct. 1992.

G. A. Voronin, "High Pressure Sintering of Diamond- and CBN-Based Composite Materials by Infiltration: Main Stages and Regularities," V. Bakel Institute for Superhard Materials of the National Academy of Science of Ukraine, pp. 467, no date.

Y. S. Ko, T. Tsurumi, O. Fukunaga, and T. Yano, "High Pressure Sintering of Diamond-SiC Composite," Journal of Material Science, vol. 36, pp. 469-475, 2001.

A. Shulzhenko, V. G. Gargin, A. A. Bochechka, G. S. Oleinik, and N. V. Danilenko, "Production, Structure, Properties, The use of Diamond Nanopowders to Strengthen a Diamond-SiC Composite Material," Journal of Superhard Materials, vol. 22, No. 3, pp. 1-13, 2000.

S. K. Gordeev, S. G. Zhukov, L. V. Danchukova, and T. C. Ekstrom, "Low-Pressure Fabrication of Diamond-SiC-Si Composites," Inorganic Materials, vol. 37, No. 6, pp. 579-583, 2001.

Stan Veprek, "the Search for Novel, Superhard Materials," J. Vac. Sci. Technol. A, vol. 17, No. 5, pp. 2401-2420, 1999.

R. A. Andrievski, "Superhard Materials Based on Nanostructured High-Melting Point Compounds: Achievements and Perspectives," International Journal of Refractory Metals & Hard Materials, vol. 19, pp. 447-452, 2001.

A. Witek, B. Palosz, S. Stel'makh, S. Gierlotka, R. Pielaszek, E. Ekimov, V. Filonenko, A. Gavriliuk, and V. Gryaznov, "Sintering of Compacts from Nanocrystalline Diamonds Without Sintering Agent," Mat. Res. Soc. Symp. Proc., vol. 499, pp. 115-120, 1998.

G. Morell, R. S. Katiyar, S. Z. Weisz, and I. Balberg, "Characterization of the Silicon Network Disorder in Hydrogenated Amorphous Silicon Carbide Alloys with Low Carbon Concentrations," Journal of Non-Crystalline Solids, vol. 194, pp. 78-84, 1996.

G. A. Voronin et al., "Diamond-SiC Nanocomposites Sintered From a Mixture of Diamond and Silicon Nanopowders," Diamond and Related Materials, vol. 12, issue 9, pp. 1173-1178, published May 2003.

Y. Zhao et al, "Enhancement of Fracture Toughness in Nanostructured Diamond SiC Composites," Applied Physics Letters, vol. 84, No. 5, pp. 1356-1358, published Feb. 2004.

J. Qian, T. W. Zerda, D. He, L. Daemen, and Y. Zhao, "Micron Diamond Composites with Nanocrystalline Silicon Carbide Bonding," J. Mater. Res., vol. 18, No. 5, pp. 1173-1178, May 2003.

* cited by examiner

DIAMOND-SILICON CARBIDE COMPOSITE

RELATED APPLICATIONS

This application is a divisional of U.S. patent application Ser. No. 10/448,672 entitled "Diamond-Silicon Carbide Composite and Method for Preparation Thereof," filed May 30, 2003, now U.S. Pat. No. 6,939,506 hereby incorporated by reference.

STATEMENT REGARDING FEDERAL RIGHTS

This invention was made with government support under Contract No. W-7405-ENG-36 awarded by the U.S. Department of Energy. The government has certain rights in the invention.

FIELD OF THE INVENTION

The present invention relates generally to composite materials and more particularly to diamond-silicon carbide composites with high fracture toughness and to a method for preparing such a composite.

BACKGROUND OF THE INVENTION

In view of their exceptionally high hardness, excellent wear resistance, and thermal stability, diamond-silicon carbide (SiC) composites have been used in various industrial applications such as machining, grinding, drilling, and mining. Diamond-SiC composites have been prepared by a variety of methods that include chemical vapor deposition, high-pressure high temperature (HPHT) liquid phase sintering, and low vacuum liquid phase infiltration.

Most available diamond-SiC composites are composed of microcrystalline diamond held together by microcrystalline SiC. Despite their extraordinary hardness and wear resistance, these composites have relatively low fracture toughness (<6 MPa·m$^{1/2}$), which limits their potential applications.

Fracture toughness of diamond-SiC composites has been improved by incorporating nanocrystalline diamond into the composites. It is believed that the nanocrystalline diamond and SiC hinder dislocation growth and microcrack propagation in the composite better than microcrystalline diamond and SiC do, which improves fracture toughness. Such a composite has been reported by E. A. Ekimov, A. G. Gavrilliuk, B. Palosz, S. Gierlotka, P. Dluzewski, E. Tatianin, Yu. Kluev, A. M. Naletov, and A. Presz in "High-Pressure, High-Temperature Synthesis of SiC-Diamond Nanocrystalline Ceramics," Applied Physics Letters, vol. 77, no. 7, pp. 954–956). The composite was prepared by the liquid silicon infiltration of nanocrystalline diamond powder under HPHT conditions HPHT (7.7 GPa, 1700–2300 K). The composite displayed high fracture toughness (10 MPa·m$^{1/2}$) but was only partially densified; infiltration depth was only 1–2 millimeters (mm) because the pores closed very quickly during infiltration due to the "self-stop process"; as silicon infiltrates through the pores, it reacts rapidly with diamond to form a silicon carbide phase that seals the pores and prevents further infiltration. Alternative methods that are not limited by the self-stop process may be required to overcome problems relating to the self-stop process in order to provide fully dense composites with high fracture toughness. Such a method would also minimize graphitization of nanocrystalline diamond, which has also been a problem in the past.

Fully dense, diamond-SiC composites having high fracture toughness remain desirable. Therefore, an object of the present invention is to provide fully dense, diamond-SiC composites having high fracture toughness.

Another object of the invention is to provide a method for preparing fully dense diamond-SiC composites having high fracture toughness.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

In accordance with the objects and purposes of the present invention, as embodied and broadly described herein, the present invention includes a method for preparing a diamond-silicon carbide composite. The method involves ball-milling microcrystalline diamond powder and microcrystalline silicon powder to form a powder mixture of microcrystalline diamond and amorphous silicon, then sintering the ball-milled powder mixture at a pressure of about 5 GPa to about 8 GPa and a temperature of about 1400K to about 2400K for a sufficient period of time to form a fully dense diamond-silicon carbide composite of microcrystalline diamond and nanocrystalline silicon carbide having a fracture toughness of at least 10 MPa·m$^{1/2}$ and with minimal graphitization.

The invention also includes a fully dense diamond-silicon carbide composite made by the method involving ball-milling a microcrystalline diamond powder and microcrystalline silicon powder to form a powder mixture of microcrystalline diamond and amorphous nanocrystalline silicon, then sintering the ball-milled powder mixture at a pressure of about 5 GPa to about 8 GPa and a temperature of about 1400K to about 2400K for a period of time sufficient to form a fully dense diamond-silicon carbide composite of microcrystalline diamond and nanocrystalline silicon carbide having a fracture toughness of at least 10 MPa·m$^{1/2}$ and with minimal graphitization.

The invention also includes a fully dense diamond-silicon carbide composite comprising microcrystalline diamond and nanocrystalline silicon carbide and having a fracture toughness of 12 MPa·m$^{1/2}$.

BRIEF DESCRIPTION OF THE DRAWINGS

The accompanying drawings, which are incorporated in and form a part of the specification, illustrate the embodiment(s) of the present invention and, together with the description, serve to explain the principles of the invention. In the drawings.

DETAILED DESCRIPTION

Figure 1:
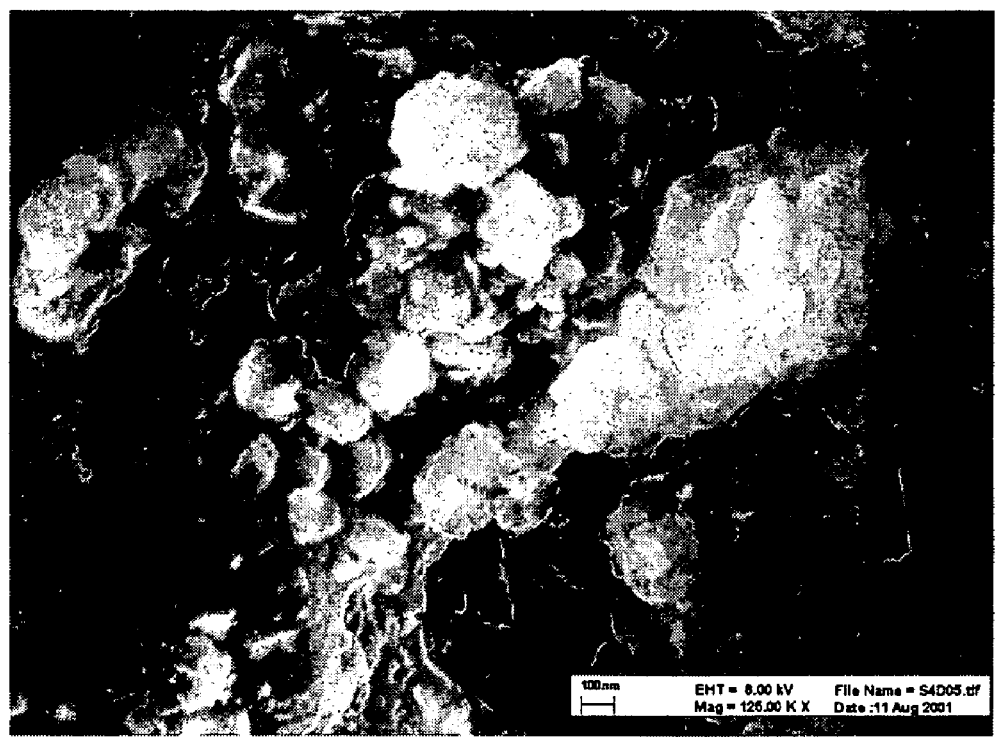
FIG. 1 shows a scanning electron micrograph of ball-milled diamond and silicon powder.

The invention includes diamond-SiC composites having high fracture toughness and a method for preparing the composites. According to the invention, microcrystalline diamond powder and microcrystalline silicon powder are combined and ball milled until the silicon becomes amorphous. The ball-milled powder is then sintered to form a composite.

A variety of techniques were used to analyze the ball-milled powder and composites prepared from the powder. The morphology and microstructure of ball-milled was examined using a field-emission SEM LEO 1530 apparatus (LEO ELECTRON SPECTROSCOPY, LTD., Cambridge, UK), which has the ability to minimize the charging effect and take high-resolution pictures under low working voltage.

The phase composition of the ball-milled powder and composites was analyzed by powder x-ray diffraction and Raman scattering spectroscopy. X-ray diffractograms were obtained using a SCINTAG XDS 2000 with a $CuK_\alpha$ source. The step was 0.02° and the expose time was 1 second/step during the measurement. Raman spectra were obtained using the incident wavelength of 785 nm. The scattered light passed through a KAISER optical spectrometer (Ann Arbor, Mich.) equipped with a notch filter, holographic gratings, and a charged-coupled device (CCD) detector. The spectral resolution was 4 $cm^{-1}$.

The bulk and shear modulus of the composites were measured on an ultrasonic interferometer (AUSTRIALIAN SCIENTIFIC INSTRUMENTS). To obtain the elastic modulus of each composite, the velocities of the longitudinal and shear waves were measured using the ultrasonic interferometer. At least five successive sample echoes were clearly visible. Overlap and interference of these sample echoes with those from the WC buffer rod enable the determination of the travel time at high frequencies (20–60 MHz) with a precision of $2 \times 10^{-6}$ seconds (see reference 20).

The densities of composites were measured on AT261 DELTA RANGE (METTLER TOLEDO, Columbus, Ohio) by using the Archimedes method.

The Vickers microindentation hardness was measured on a MICRO4 micron hardness tester (BUEHLER LTD). The load applied to the indenter was 9.8 Newtons and holding time was 15 seconds. Twelve indentations were made to obtain the average hardness value for each composite. The fracture toughness was measured with a larger applied load (490 Newtons) using MACROVICKERS 5114 (BUEHLER LTD).

Ball-milled powder of the invention was sintered using a tungsten carbide, toroidal high-pressure apparatus (SUPERHARD MATERIALS INSTITUTE, Kiev, Ukraine, references 18 and 19) equipped with a hydraulic press (ROCKLAND RESEARCH, N.Y.). The pressure was calibrated by detecting phase transitions in bismuth (Bi) and lead-tellurium (PbTe) alloy. The temperature of the cell was calibrated using a $W_{3\%}Re/W_{25\%}Re$ thermocouple by measuring the temperature near the center of the cell as a function of dissipated electric power. The calibration curves, pressure versus load, and temperature versus power were reproducible, and the estimated maximum deviation of temperature was ±100 K, and pressure about ±0.5 GPa. The calibration curves were used in sintering experiments for temperature and pressure evaluation.

The following EXAMPLES provide details for preparing composites of the invention (EXAMPLES E, F, and G) and several comparison composites (EXAMPLES B, C, D, H). EXAMPLES A–G employed ball-milled powder. EXAMPLE H describes the preparation of a composite by liquid infiltration, similar to that described by Ekimov (reference 12). The compact of EXAMPLE A was compressed but not sintered. The parameters of pressure, temperature, sintering time, hardness, and fracture toughness of the products of EXAMPLES A–H are summarized in Table 1.

EXAMPLE A

About 5 grams of synthetic diamond powder having a grain size of about 5–10 micrometers (μm) (General Electric Co., Worthington, Ohio) and about 1.25 grams of silicon powder having a grain size of about 1–20 μm (Alfa Aesar, Ward Hill, Mass.) were mixed together and placed into a tungsten carbide vial with tungsten carbide balls. The vial was placed in a CERTIPREP SPEX 8000-D mixer mill (Metuchen, N.J.) inside a sealed glove box that was purged with argon. The powder mixture was ball milled for about 11 hours. The ball-milled powder was removed and the diamond-to-silicon weight ratio of the ball-milled powder was determined to be 84:16 by energy disperse x-ray analysis. The powder was further characterized by scanning electron microscopy, x-ray diffraction and Raman spectroscopy.

FIG. 1 shows a scanning electron micrograph (SEM) of the ball-milled powder. FIG. 1 shows that the ball-milled powder particles have round shapes and are stuck together.

Figure 2:
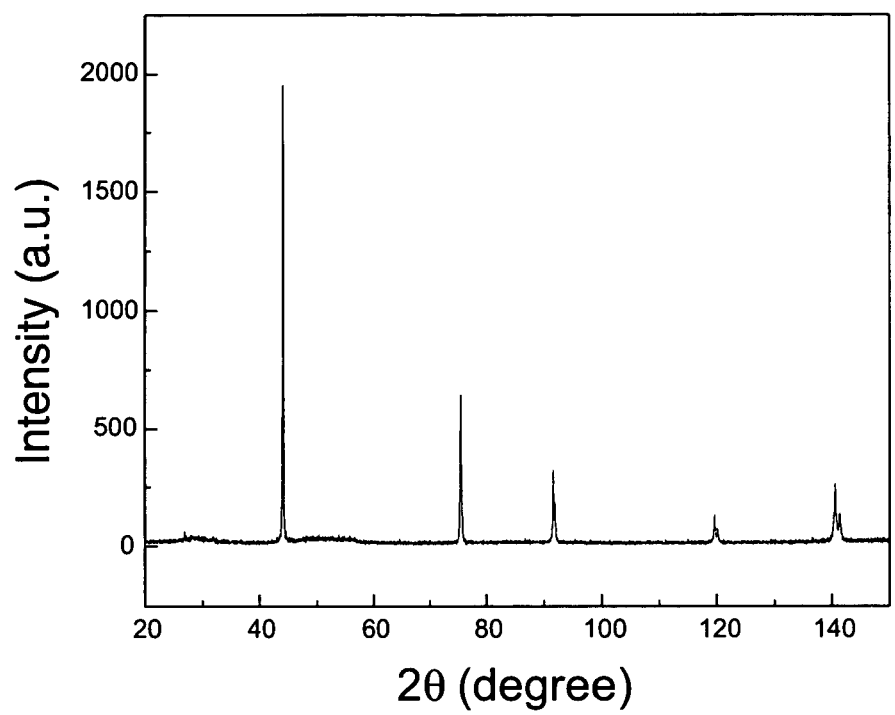
FIG. 2 shows an x-ray diffraction pattern of the ball-milled powder of FIG. 1.

FIG. 2 shows an x-ray diffraction pattern for the ball-milled powder. As FIG. 2 shows, the diamond Bragg peaks are sharp and intense. No peak broadening from strain and size effect was observed. While crystalline silicon was used to prepare this powder, no diffraction peaks for crystalline silicon appear in the pattern, which indicates that the ball milling has transformed silicon from the crystalline to the amorphous state. Two tiny humps, one at $2\theta=28°$ and the other at $2\theta=52°$, are barely distinguishable and indicate that silicon is almost completely amorphous. No peaks due to tungsten carbide (WC) peaks are apparent in FIG. 2.

Figure 3:
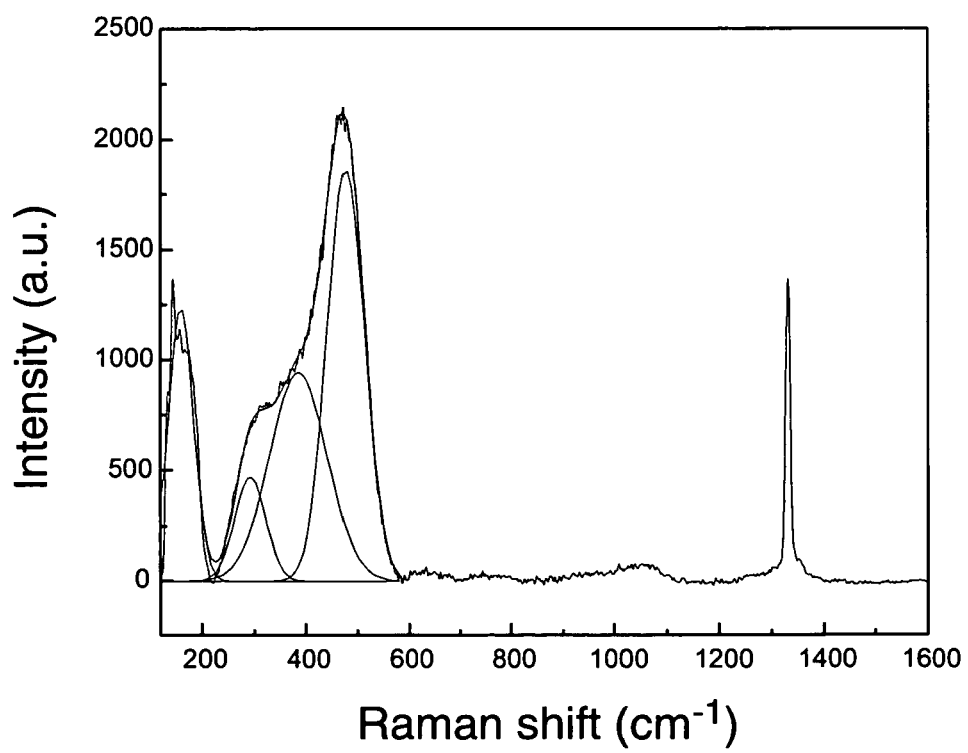
FIG. 3 shows a Raman spectrum of the ball-milled powder of FIG. 1.

FIG. 3 shows a Raman spectrum of the ball-milled powder. The power was kept low, below 10 mW, and the powder was dispersed in water to dissipate heat because diamond powder and silicon powder are sensitive to laser-induced degradation and local heating, especially for grain sizes on the nanometer scale. The spectrum includes Raman peaks for diamond and amorphous silicon. The diamond $F_{2g}$ peak is located at 1332 $cm^{-1}$. The broad peak at about 500 $cm^{-1}$ can be explained as a signature of amorphous silicon and can be approximated by a sum of four Gaussian functions that are located at 169, 296, 390, and 474 $cm^{-1}$ with full widths at half maximum (FWHM) of 42, 66, 103, and 68 $cm^{-1}$, respectively. The agreement between the theoretical prediction and the experimental contour within the frequency region between 200–600 $cm^{-1}$ was excellent.

Together, the SEM, x-ray diffraction pattern, and Raman spectrum of FIGS. 1, 2, and 3 respectively, provide strong evidence that the ball-milled powder is a mixture of crystalline diamond and amorphous silicon.

The ball-milled powder was placed into the sintering apparatus and compressed at 5 GPa (±0.5 GPa) at room temperature for about 300 seconds. The product was a compact in the form of a tablet with a diameter of 6 millimeters and a height of about 2 millimeters. It had a Vickers hardness of 6 GPa and a Knoop hardness of 4 GPa.

The fracture toughness was not measured. The surfaces were ground using a diamond metal bonded wheel and then polished using 0.5 micron diamond spray and 0.1 micron diamond paper. The compact was characterized by x-ray diffraction analysis and Raman spectroscopy. The x-ray diffraction pattern and Raman spectrum of the compact, shown in FIG. 4a and FIG. 5a respectively, appeared to be almost identical to those for the ball-milled powder shown in FIG. 2 and FIG. 3.

EXAMPLE B

Figure 4:
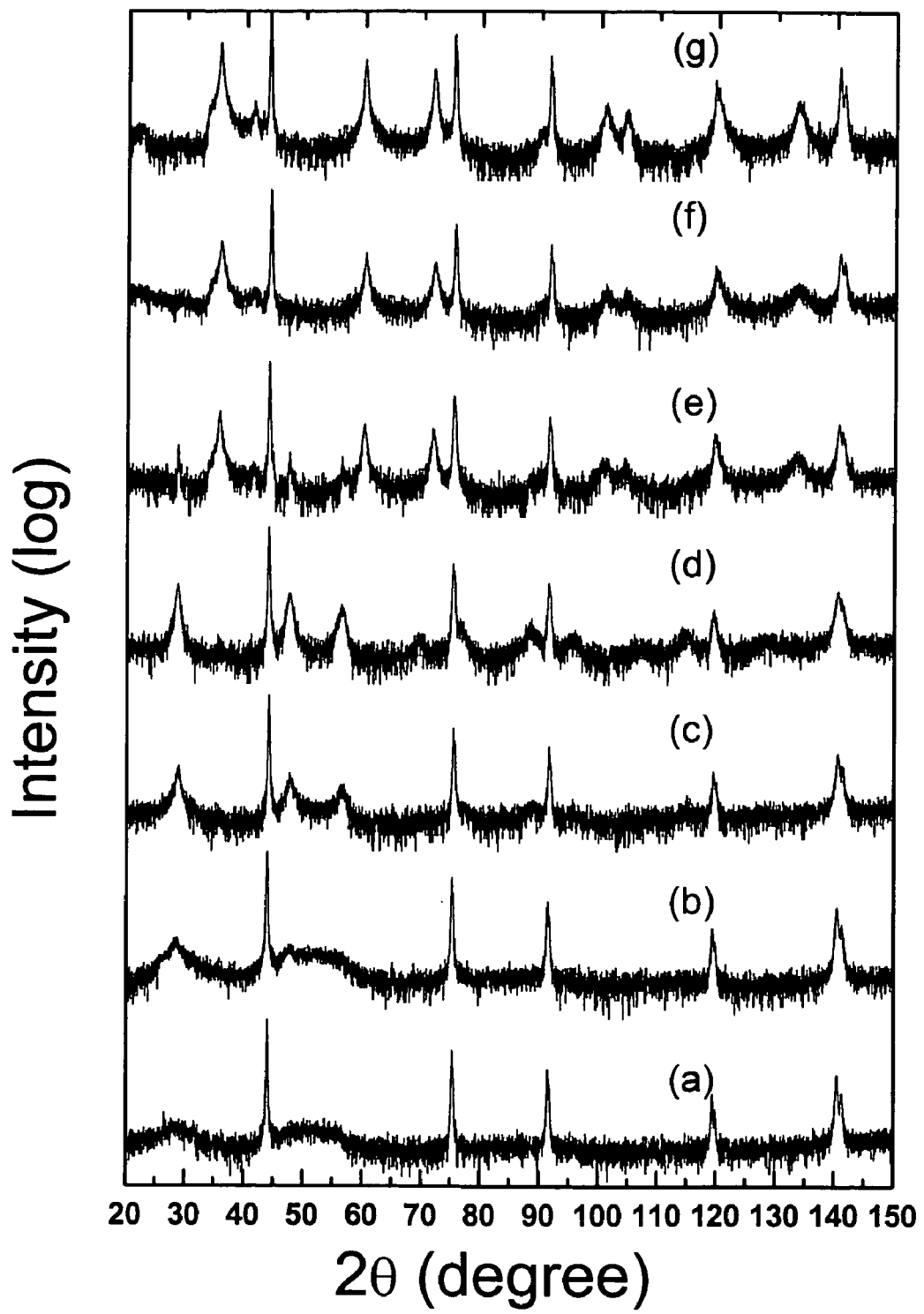
FIG. 4a–g shows x-ray diffraction patterns for composites prepared using the ball-milled powder of FIG. 1.
Figure 5:
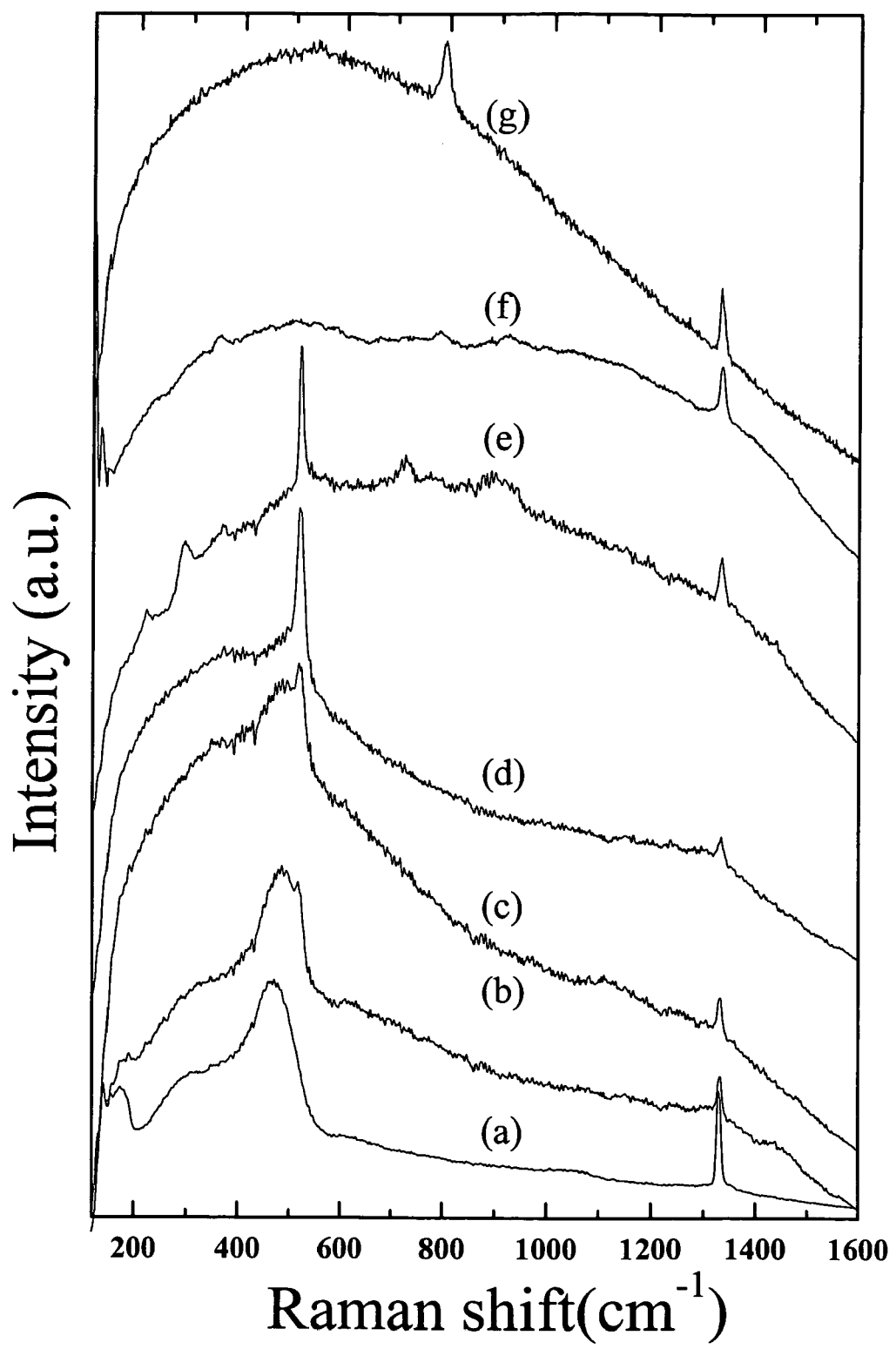
FIG. 5a–g shows Raman spectra of the composites having the x-ray diffraction patterns of FIG. 4a–g, respectively.

Ball-milled powder, prepared according to the procedure of EXAMPLE A, was placed into the sintering apparatus. The powder was first subjected to a pressure of 5 GPa (±0.5 GPa) at room temperature within 10 minutes, after which the temperature was increased to 873K within a 3 minute period. The temperature was maintained at 873K (±50K) for 30 seconds, after which the temperature was lowered to room temperature within a 5 minute period. The resulting composite was in the form of a tablet with a diameter of 6 millimeters and a height of about 2 millimeters, and had a Vickers hardness of 12 GPa, a Knoop hardness of 10 GPa, a Young's modulus of 153 GPa, and a fracture toughness of 3 MPa·m$^{1/2}$. The surfaces were ground using a diamond metal bonded wheel and then polished using 0.5 micron diamond spray and 0.1 micron diamond paper. The x-ray diffraction pattern and Raman spectrum of the composite are shown in FIG. 4b and FIG. 5b, respectively.

EXAMPLE C

Ball-milled powder, prepared according to the procedure of EXAMPLE A, was placed into the sintering apparatus. The powder was first subjected to a pressure of 5 GPa (±0.5 GPa) at room temperature within 10 minutes, after which the temperature was increased to 1273K within a 3 minute period. The temperature was maintained at 1273K (±50K) for 30 seconds, after which the temperature was lowered to room temperature within a 5 minute period. The resulting composite was in the form of a tablet with a diameter of 6 millimeters and a height of about 2 millimeters, and had a Vickers hardness of 14 GPa, a Knoop hardness of 12 GPa, a Young's modulus of 167 GPa, and a fracture toughness of 3 MPa·m$^{1/2}$. The surfaces were ground using a diamond metal bonded wheel and then polished using 0.5 micron diamond spray and 0.1 micron diamond paper. The x-ray diffraction pattern and Raman spectrum of the composite are shown in FIG. 4c and FIG. 5c, respectively.

EXAMPLE D

Ball-milled powder, prepared according to the procedure of EXAMPLE A, was placed into the sintering apparatus. The powder was first subjected to a pressure of 5 GPa (±0.5 GPa) at room temperature within 10 minutes, after which the temperature was increased to 1473K within a 3 minute period. The temperature was maintained at 1473K (±50K) for 5 seconds, after which the temperature was lowered to room temperature within a 5 minute period. The resulting composite was in the form of a tablet with a diameter of 6 millimeters and a height of about 2 millimeters, and had a Vickers hardness of 17 GPa, a Knoop hardness of 17 GPa, a Young's modulus of 410 GPa, and a fracture toughness of 7 MPa·m$^{1/2}$. The x-ray diffraction pattern and Raman spectrum of the composite are shown in FIG. 4d and FIG. 5d, respectively.

EXAMPLE E

The ball-milled powder prepared according to EXAMPLE A was first subjected to a pressure of 5 GPa (±0.5 GPa) at room temperature within 10 minutes, after which the temperature was increased to 1473K within a 3 minute period. The temperature was maintained at 1473K (±50K) for 30 seconds, after which the temperature was lowered to room temperature within a 5 minute period. The product was a dense diamond-SiC composite (density 3.3 gram/cm$^3$, porosity 3.5%) in the form of a tablet with a diameter of 6 millimeters and a height of about 2 millimeters. The surfaces were ground using a diamond metal bonded wheel and then polished using 0.5 micron diamond spray and 0.1 micron diamond paper. The x-ray diffraction pattern and Raman spectrum of the composite are shown in FIG. 4e and FIG. 5e, respectively. The composite had a Vickers hardness of 36 GPa, a Knoop Hardness of 28 GPa, a Young's modulus of 507 GPa, and a fracture toughness of 10 MPa·m$^{1/2}$.

EXAMPLE F

Figure 6:
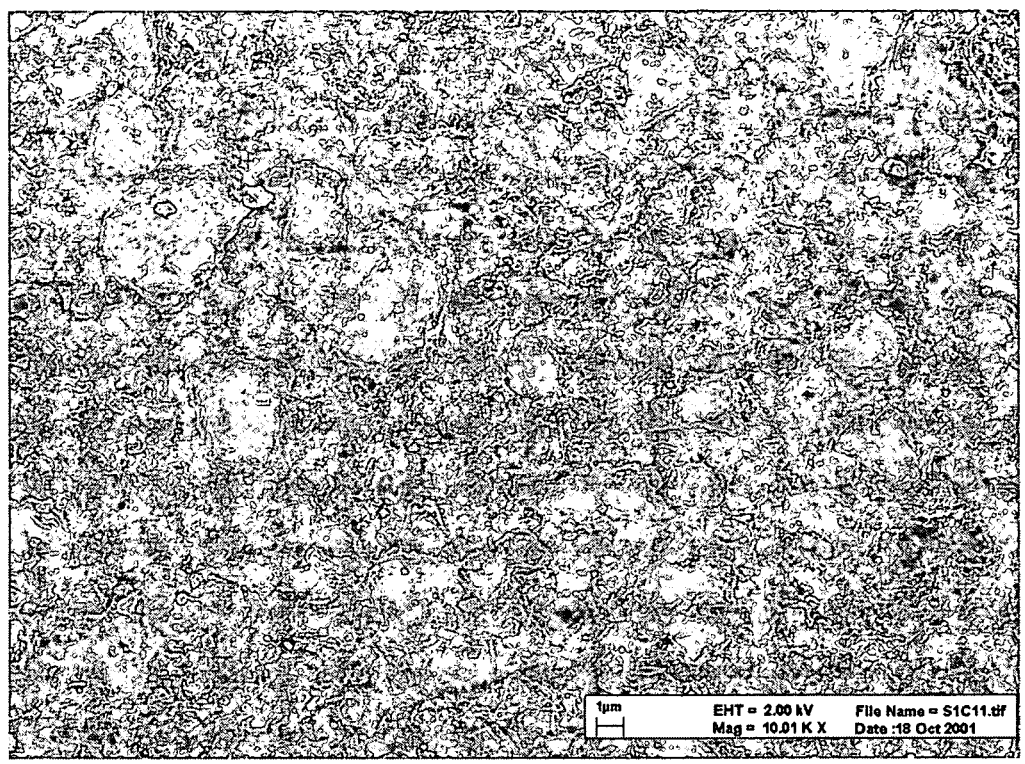
FIG. 6 shows a scanning electron micrograph of the invention diamond-silicon composite of EXAMPLE F.

Ball-milled powder prepared according to EXAMPLE A was first subjected to a pressure of 5 GPa (±0.5 GPa) at room temperature within 10 minutes, after which the temperature was increased to 1673K within a 3 minute period. The temperature was maintained at 1673K (±50K) for 30 seconds, after which the temperature was lowered to room temperature within a 5 minutes period. The product was a fully dense diamond-SiC composite (density 3.37 gram/cm$^3$, porosity 1.7%) in the form of a tablet with a diameter of 6 millimeters and a height of about 2 millimeters. The surfaces were ground using a diamond metal bonded wheel and then polished using 0.5 micron diamond spray and 0.1 micron diamond paper. FIG. 6 shows a scanning electron micrograph (SEM) of the polished composite. The x-ray diffraction pattern and Raman spectrum of the composite are shown in FIG. 4f and FIG. 5f, respectively. The composite had a Vickers hardness of 46 GPa, a Knoop hardness of 40 GPa, a Young's modulus of 564 GPa, and a fracture toughness of 12 MPa·m$^{1/2}$.

EXAMPLE G

Ball-milled powder prepared according to EXAMPLE A was first subjected to a pressure of 8 GP (±0.5 GPa) at room temperature within 20 minutes, after which the temperature was increased to 2273K within a 3 minute period. The temperature was maintained at 2273K (±100K) for 20 seconds, after which the temperature was lowered to room temperature within a 5 minutes period. The product was a fully dense diamond-SiC composite (density 3.38 gram/cm$^3$, porosity 0.9%) in the form of a tablet with a diameter of 6 millimeters and a height of about 2 millimeters. The surfaces were ground using a diamond metal bonded wheel and then polished using 0.5 micron diamond spray and 0.1 micron diamond paper. Compact was then characterized by and x-ray diffraction (FIG. 4g) and Raman spectroscopy (FIG. 5g). The composite had a Vickers hardness of 45 GPa, a Knoop hardness of 42 GPa, a Young's modulus of 560 GPa, and a fracture toughness of 12 MPa·m$^{1/2}$.

EXAMPLE H

About 100 milligrams of synthetic diamond powder having a grain size of about 5–10 micrometers (μm) (General Electric Co., Worthington, Ohio) and about 20 milligrams of silicon powder having a grain size of about 1–20 μm (Alfa Aesar, Ward Hill, Mass.) were placed as top and bottom layers, respectively, in the graphite furnace of the sintering apparatus. The powder was first subjected to a pressure of 5 GPa (±0.5 GPa) at room temperature within 10 minutes, after which the temperature was increased to 1673K within a 3 minute period. The temperature was maintained at 1673K (±50K) for 30 seconds, after which the temperature was lowered to room temperature within a 5 minute period. The product was a fully dense diamond-SiC composite (density 3.4 gram/cm$^3$, porosity 0.6%) in the form of a tablet with a diameter of 6 millimeters and a height of about 2 millimeters. The surfaces were ground using a diamond metal bonded wheel and then polished using 0.5 micron diamond spray and 0.1 micron diamond paper. The composite had a Vickers hardness of 54 GPa, a Knoop hardness of 52 GPa, a Young's modulus of 575 GPa, and a fracture toughness of 8 MPa·m$^{1/2}$.

nated by the signal for a-Si. As the processing temperature increases from room temperature to 873 and then to 1273 and then to 1473, the intensity of the a-Si peaks decrease while the intensity of the crystalline silicon peak at 521 cm$^{-1}$ increases. It should also be noted that full width at half maximum (FWHM) of the 521 cm$^{-1}$ peak decreases from 27 cm$^{-1}$ to 22 cm$^{-1}$ and finally to 17 cm$^{-1}$. These changes are believed to indicate an increase in long-range order of silicon in the corresponding composite.

The invention composite of EXAMPLE E was prepared at the same sintering temperature and pressure as that for EXAMPLE D, but the sintering time was lengthened from 5 seconds to 30 seconds. The Raman spectrum for the composite of EXAMPLE E includes a peak at about 800 cm$^{-1}$ and another at about 950 cm$^{-1}$. These peaks are related to nanocrystalline SiC. The peak at about 521 cm$^{-1}$ is even sharper for the composite of EXAMPLE E than that for EXAMPLE D, approaching 10 cm$^{-1}$ (reference 23). These differences are consistent with the formation of nanocrys-

TABLE 1

| | EXAMPLE | | | | | | | |
|---|---|---|---|---|---|---|---|---|
| | A | B | C | D | E | F | G | H |
| Pressure (GPa) | 5 | 5 | 5 | 5 | 5 | 5 | 8 | 5 |
| Temperature (K) | room temperature | 873 | 1273 | 1473 | 1473 | 1673 | 2273 | 1673 |
| Sintering time (sec) at temperature | 300 | 30 | 30 | 5 | 30 | 30 | 20 | 30 |
| Vickers hardness (GPa) | 6 | 12 | 14 | 17 | 36 | 46 | 45 | 54 |
| Knoop Hardness (GPa) | 4 | 10 | 12 | 17 | 26 | 40 | 42 | 52 |
| Young's modulus (GPa) | — | 153 | 167 | 410 | 507 | 564 | 560 | 575 |
| Fracture toughness (MPa · m$^{1/2}$) | — | 3 | 3 | 7 | 10 | 12 | 12 | 8 |

EXAMPLE A demonstrates the effect of compression alone (5 GPa for 300 seconds) on the ball-milled powder. The x-ray diffraction pattern of the compact, which is shown in FIG. 4a, is substantially the same as that for uncompressed, ball-milled powder shown in FIG. 2. Sharp and intense peaks from diamond indicate that the microcrystalline state has not been modified by compression. Two broad humps at 2θ=28° and 52° indicate that compression to 5 GPa has a negligible effect on amorphous silicon (a-Si) crystallization.

The composites of EXAMPLES B, C, and D are non-invention composites prepared by sintering at 5 GPa/873k/30 sec, 5 GPa/1273K/30 sec, 5 GPa/1473K/5 sec, respectively. The composites of examples B and C are formed at too low a sintering temperature to form a composite with high fracture toughness. The composite of EXAMPLE D, on the other hand, was sintered at a high enough temperature but for too short a time (see EXAMPLE E). The x-ray diffraction patterns, which are shown in FIGS. 4b, 4c, and 4d respectively, show small peaks due to crystalline silicon that appear in the composite of EXAMPLE B and increase in intensity as the sintering temperature increases from 873K (EXAMPLE B) to 1273K (EXAMPLE C) to 1473K (EXAMPLE D). The formation of crystalline silicon is also evident from changes in the Raman spectra. The Raman diamond peak is consistently located at 1332 cm$^{-1}$, but other spectral features provide evidence of transformation of amorphous silicon into crystalline silicon, and then into silicon carbide. FIG. 5a shows the Raman spectrum for the non-sintered composite of EXAMPLE A. As FIG. 5a shows, the low frequency region of the Raman spectrum is domitalline SiC, and are supported by the x-ray diffraction pattern of FIG. 4e, which indicates the growth of silicon grains.

The invention composites of EXAMPLES F and G were prepared at 1673K and 2273K, respectively (higher temperature than for EXAMPLE E). The resulting composites have what is believed to be the highest fracture toughness (12 MPa·m$^{1/2}$) reported for a diamond-SiC composite.

FIG. 6 provides a scanning electron micrograph for the composite of EXAMPLE F. According to the micrograph, the composite includes 1–10 micron sized diamond grains that are surrounded by nanocrystalline grains of SiC. The Raman spectrum of the composite is shown in FIG. 5f, and does not appear to include peaks due to silicon, which indicates that silicon has reacted completely, or nearly completely, with diamond to form SiC.

The observed x-ray patterns and Raman spectra for the products formed according to the EXAMPLES can be explained as follows. Invention composites are not formed at temperatures under 1273K. At 1473K, an invention composite is not formed if the sintering time is too short (5 seconds). According to the invention, a sintering time of about 30 seconds at 1473K is long enough for carbon atoms to diffuse from the diamond phase into liquid silicon and react to form SiC. Higher temperatures increase the carbon diffusion rate, leading to consumption of the silicon.

The composite formed by infiltration (EXAMPLE H) is harder, but has a lower fracture toughness than the invention composite of EXAMPLE F. These differences may be explained by the differences in size of the SiC grains. The infiltration composite includes microcrystalline SiC grains whereas the invention composite includes nanocrystalline SiC grains. It is the combination of microcrystalline diamond and nanocrystalline SiC grains that characterizes the composites of the invention and this combination provides composites of the invention with enhanced fracture toughness. Moreover, the conversion of silicon to the amorphous phase during milling appears to be critical to the invention. Amorphous silicon reacts with diamond to form nanocrystalline silicon carbide, which appears to be inhibited from any further grain growth when subjected to the sintering conditions described herein.

The foregoing description of the invention has been presented for purposes of illustration and description and is not intended to be exhaustive or to limit the invention to the precise form disclosed, and obviously many modifications and variations are possible in light of the above teaching.

The embodiment(s) were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

The invention claimed is:

1. A fully dense diamond-silicon carbide composite made by the method comprising ball-milling a mixture of microcrystalline diamond powder and crystalline silicon to form a ball-milled powder mixture of microcrystalline diamond and amorphous silicon, then sintering the ball-milled powder mixture at a pressure of about 5 GPa to about 8 GPa and a temperature from about 1400K to about 2300K to form a fully dense diamond-silicon carbide composite comprising microcrystalline diamond and nanocrystalline silicon carbide and having a fracture toughness of at least 10 MPa·m$^{1/2}$ with minimal graphitization.

2. The composite of claim 1 having a fracture toughness of 12 MPa·m$^{1/2}$.

3. The composite of claim 1, wherein the ball-milled powder is sintered at a pressure of about 5 GPa and a temperature of about 1423K to about 1523K.

4. The composite of claim 1, wherein the ball-milled powder is sintered at a pressure of about 5 GPa and a temperature of about 1623K to about 1723K.

5. The composite of claim 1, wherein the ball-milled powder is sintered at a pressure of about 8 GPa and a temperature of about 2223K to about 2300K.

* * * * *